W. V. TURNER.
ELECTROPNEUMATIC BRAKE MECHANISM.
APPLICATION FILED SEPT. 10, 1912.

1,131,971.

Patented Mar. 16, 1915.
5 SHEETS—SHEET 1.

W. V. TURNER.
ELECTROPNEUMATIC BRAKE MECHANISM.
APPLICATION FILED SEPT. 10, 1912.

1,131,971. Patented Mar. 16, 1915.
5 SHEETS—SHEET 3.

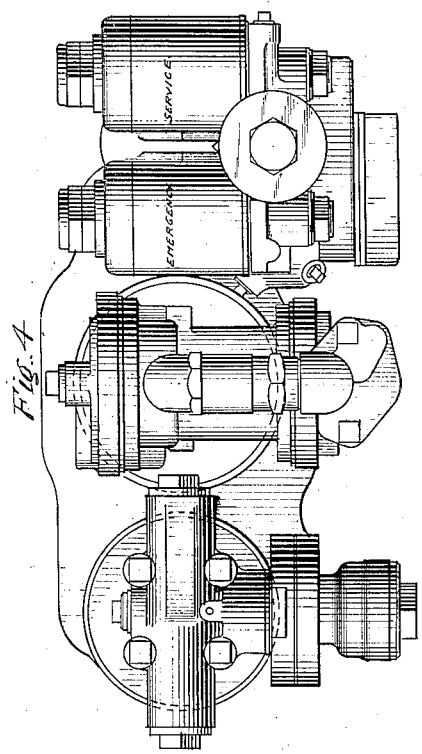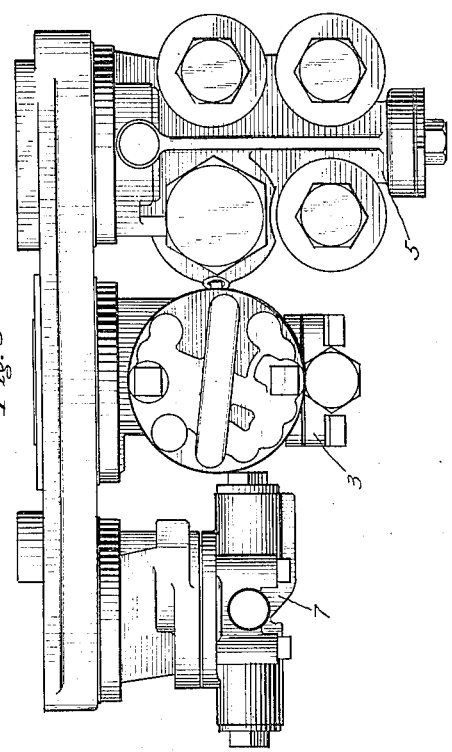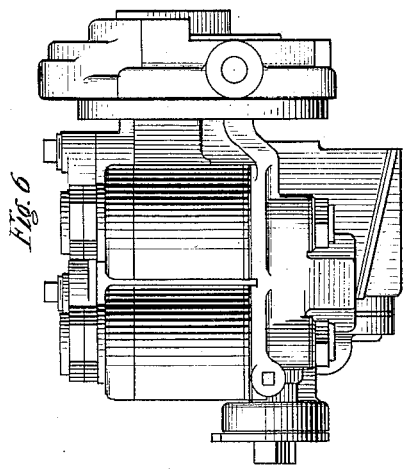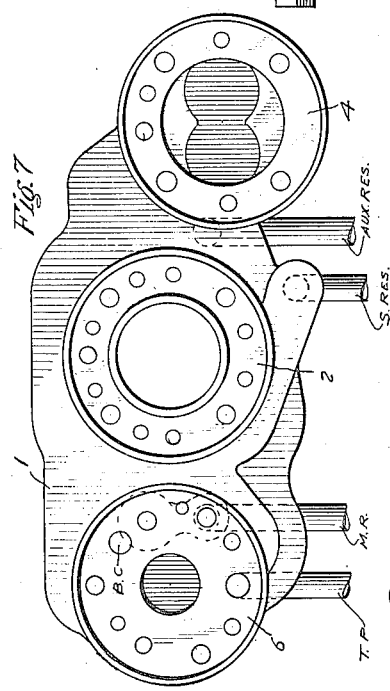

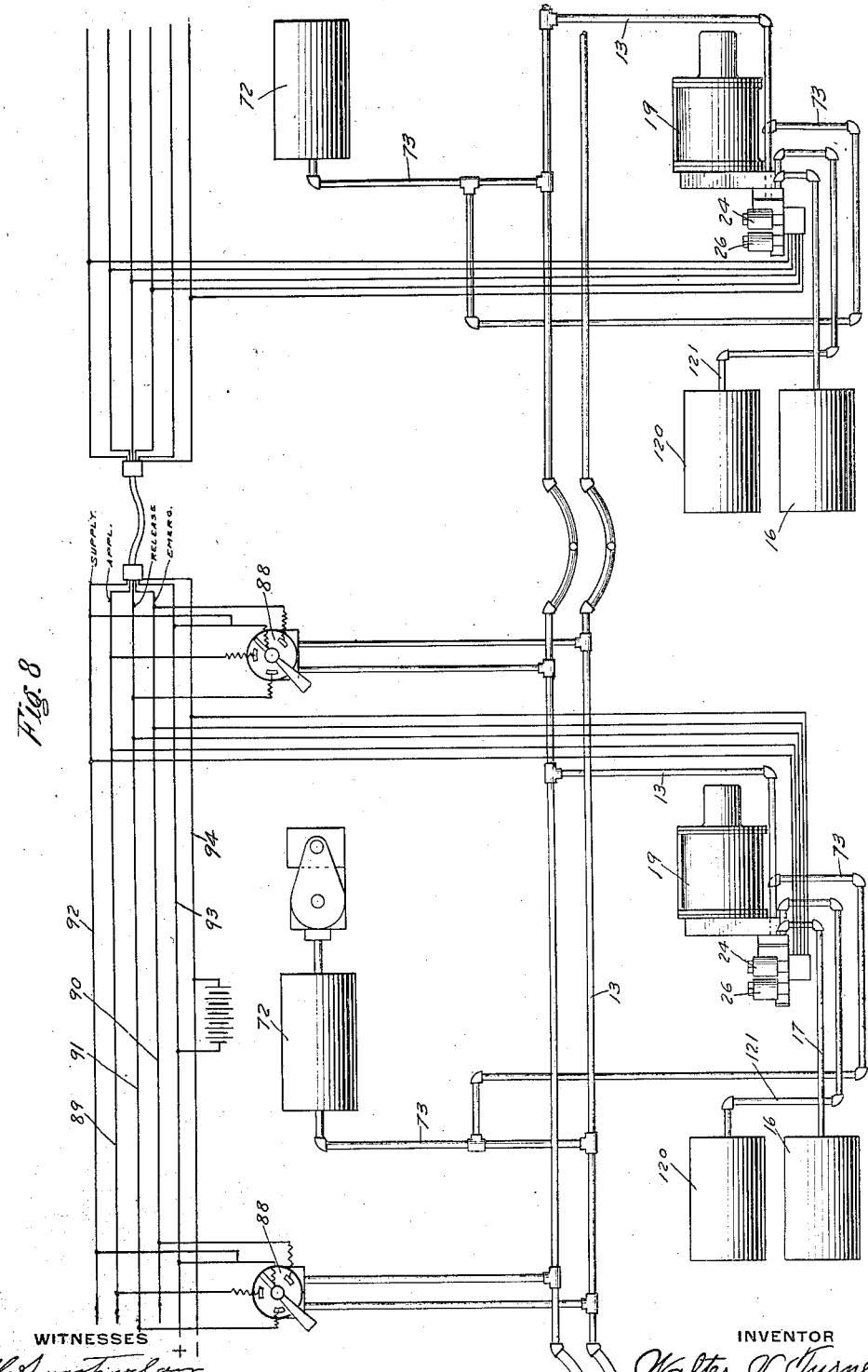

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE MECHANISM.

1,131,971.      Specification of Letters Patent.      Patented Mar. 16, 1915.

Application filed September 10, 1912. Serial No. 719,607.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brake Mechanism, of which the following is a specification.

This invention relates to fluid pressure brakes, and more particularly to an electrically controlled valve mechanism for controlling the application and the release of the brakes.

One object of my invention is to provide a brake controlling valve mechanism having detachable portions, one or more of which may be employed according to the service requirements so that one brake equipment will provide for a considerable range of service.

Another object of my invention is to provide a valve device operated by a reduction in pressure for effecting an application of the brakes and having an additional passage through which the pressure may be reduced and means for limiting said reduction in pressure to a predetermined degree.

Another object of my invention is to provide a release valve mechanism separate from the automatic valve device for controlling the brake cylinder exhaust, so as to eliminate large ports in the automatic valve device and thereby permit the employment of a smaller and more compact valve device, and one which can be operated more readily and with greater positiveness.

Another object of my invention is to provide a valve mechanism for controlling the application and release of the brakes having means for securing a maximum sensitiveness to releasing and a minimum sensitiveness to applying the brakes.

Other objects and advantages of my invention will appear in the following more detailed description thereof.

Figure 1:
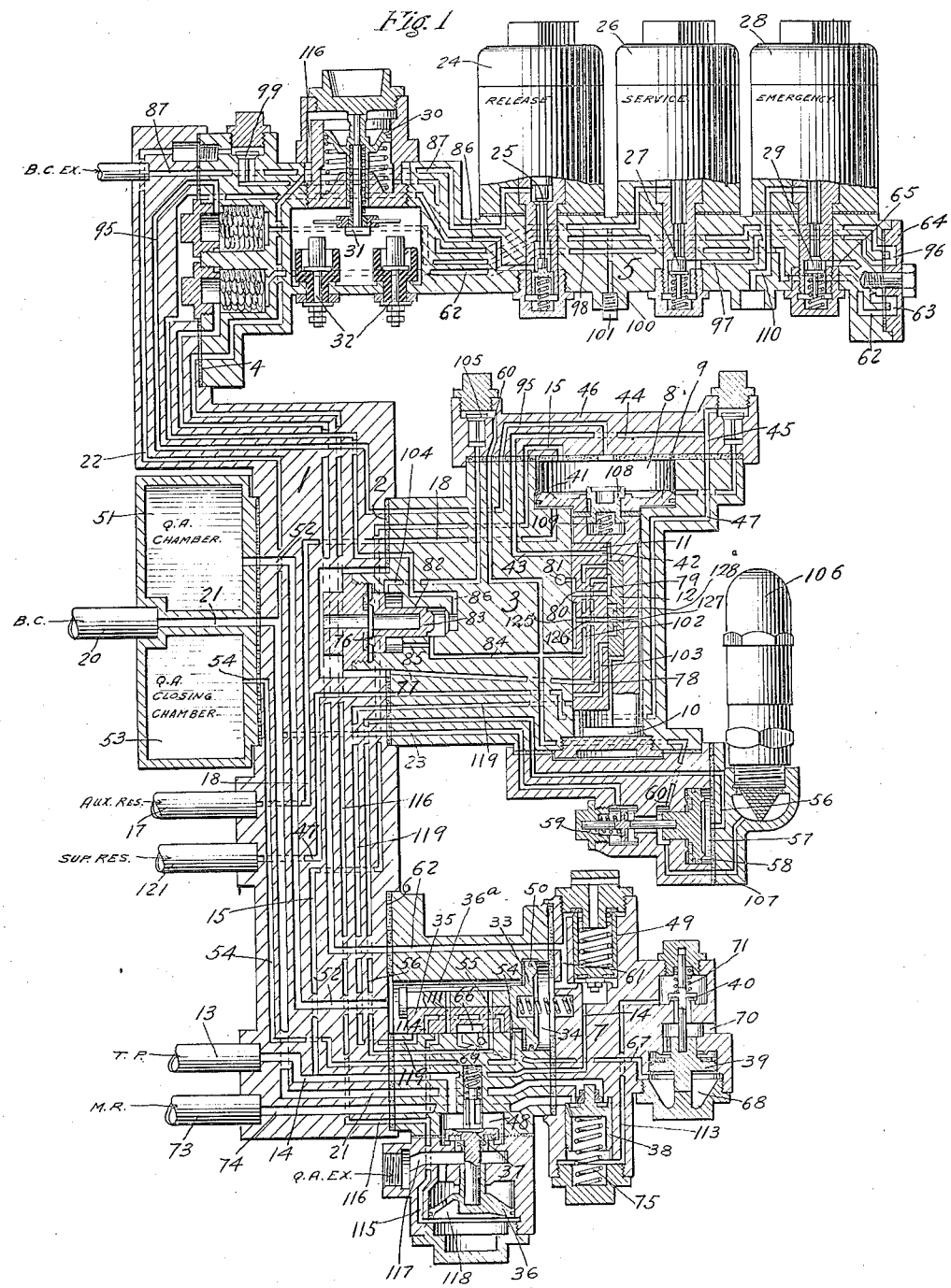
Figure 2:
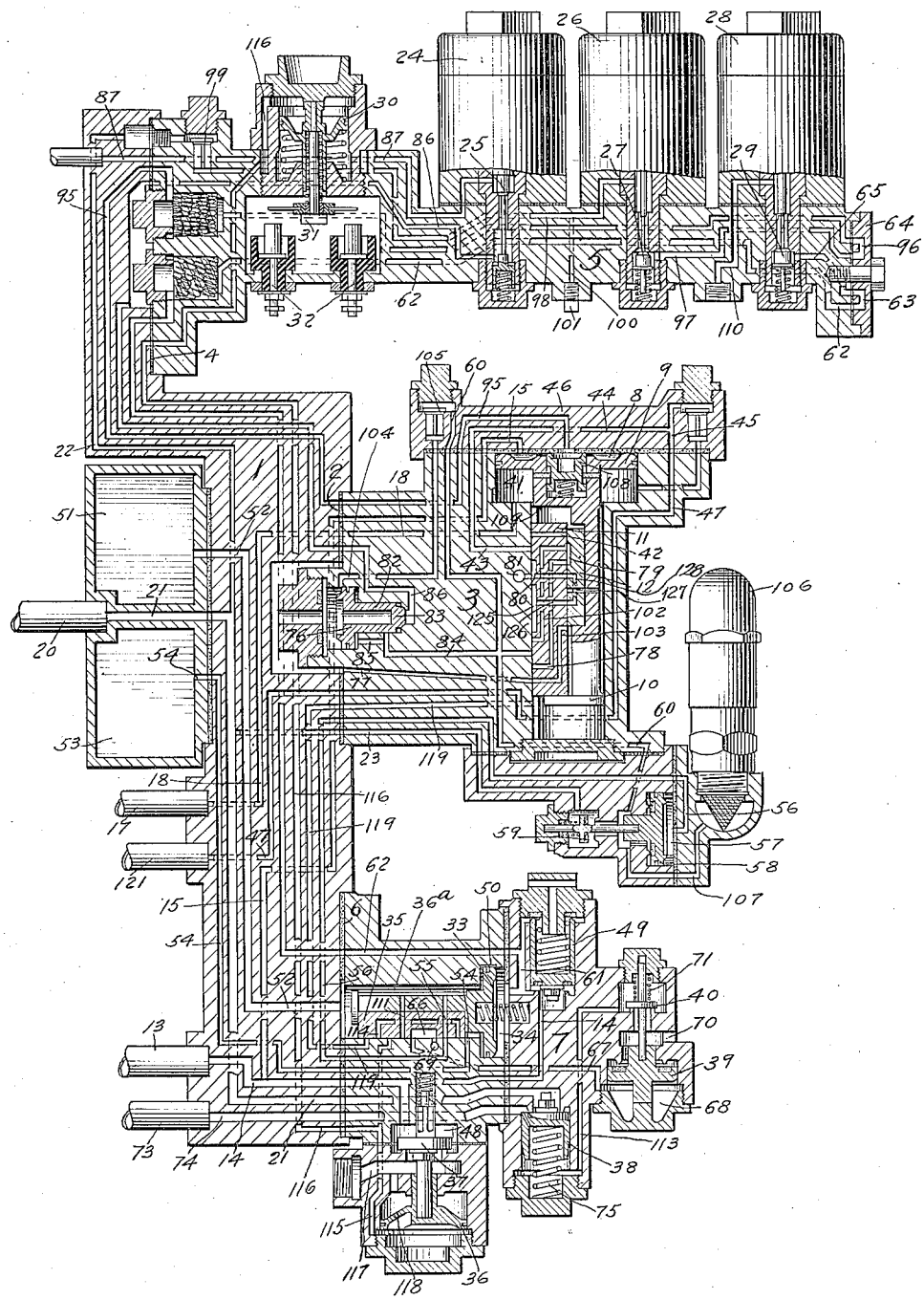
Figure 3:
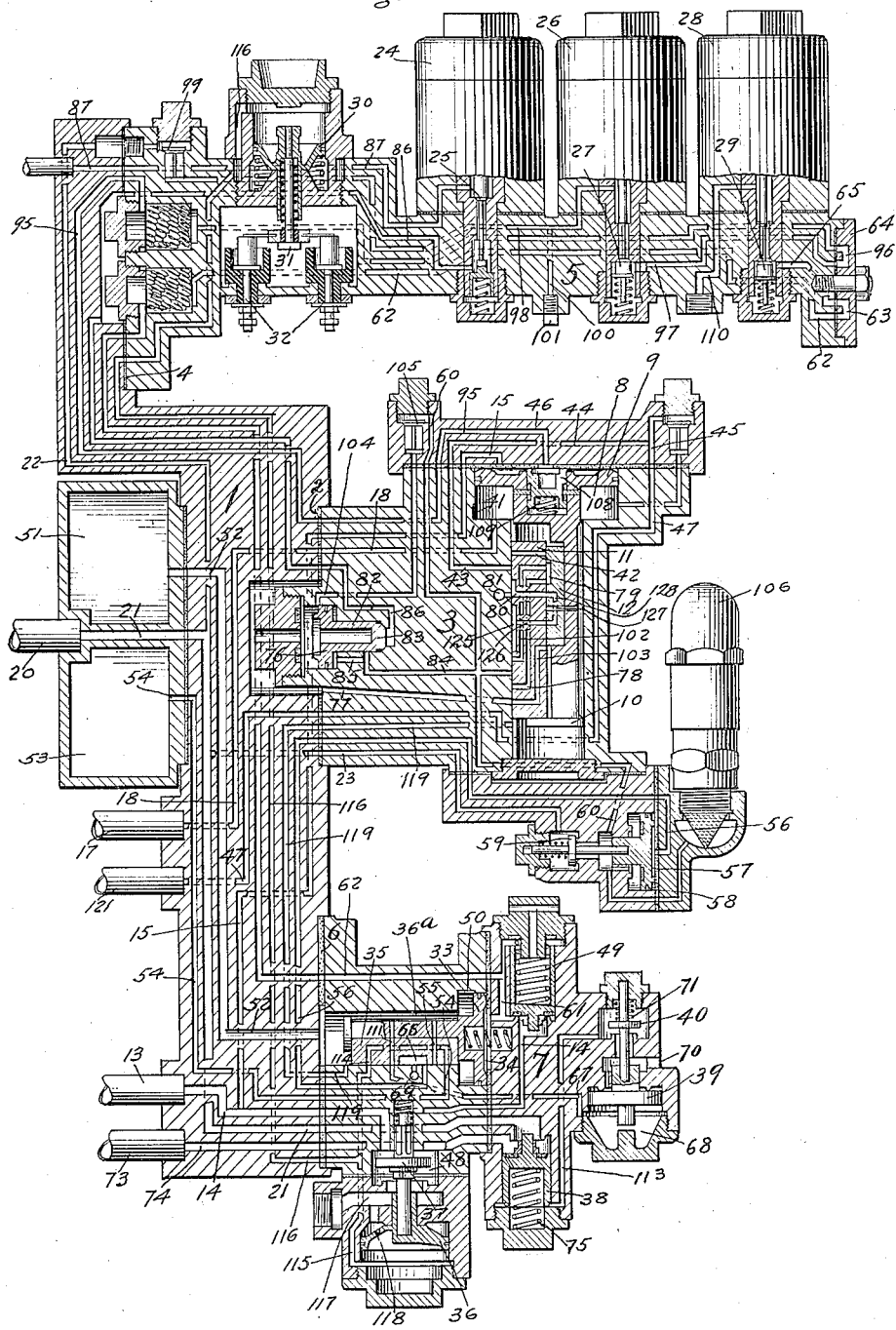

In the accompanying drawings; Figure 1 is a diagrammatical sectional view of an electro-pneumatic valve device embodying my invention and showing the parts in release position; Fig. 2 a similar view, showing the parts in electric service application position; Fig. 3 a similar view, showing the parts in electric emergency application position; Fig. 4 a front elevation of the improved electro-pneumatic valve device as actually constructed; Fig. 5 a plan view thereof; Fig. 6 an end view thereof; Fig. 7 a front elevation of the bracket to which the various operating units of the electro-pneumatic valve device are secured; and Fig. 8 a piping and wiring diagram for a two car equipment, showing the electro-pneumatic valve device applied thereto.

According to one of the features of my invention, one equipment is adapted to be employed in various kinds of service having different requirements by merely applying or removing unitary devices each adapted to provide for certain operating functions; for example, the simplest form of the equipment may consist of the triple or equalizing valve device operated by variations in train pipe pressure for controlling the application and release of the brakes. To this may be added an emergency valve mechanism for effecting quick serial action and a high emergency brake cylinder pressure. Similarly if an electro-pneumatic brake is desired, an electrically controlled valve mechanism may be added to the equipment. In addition, the apparatus may be adjusted either for graduated release or the usual straight release.

As shown in Figs. 4 to 7 inclusive, a main bracket 1 is provided on which is located three gasket faces, the central face 2 having the necessary port connections for an equalizing valve portion 3, the gasket face 4 having port connections for an electric control portion 5, and the gasket face 6 having port connections for an emergency valve portion 7.

As shown in Fig. 1, the equalizing valve portion 3 has a piston chamber 8 containing the equalizing piston 9 and a valve chamber 10 containing main slide valve 11 and graduating slide valve 12 both adapted to be operated by piston 9. The train pipe 13 opens into a passage 14 in the bracket 1 and a passage 15 connected to passage 14 leads to the piston chamber 8. Auxiliary reservoir 16 is connected by pipe 17 to passage 18 in the bracket 1 which opens into valve chamber 10. Brake cylinder 19 is connected by pipe 20 to passage 21 leading to the emergency gasket face 6 and said passage has a branch 22 leading to the electric gasket face 4 and a branch 23 leading to the equalizing gasket face 2.

The electric portion 5 may comprise a release magnet 24 adapted to operate a release valve 25, a magnet 26 for operating a service application valve 27, and a magnet 28 for operating an emergency valve 29. This portion may also include an emergency switch device comprising a piston 30 and a movable switch 31 adapted to be operated by the piston for closing the circuit of the emergency magnet 28 through the stationary switch contacts 32.

The emergency valve mechanism may comprise an emergency piston 33 contained in piston chamber 34, a slide valve 35 contained in valve chamber 36ª and adapted to be operated by said piston, a quick action valve device having a piston 36 for operating a quick action vent valve 37, a high pressure emergency valve device 38 for controlling the direct admission of air from the main reservoir to the brake cylinder, and a pilot valve mechanism having a piston 39 and valve 40 for controlling the operation of the high pressure valve device 38.

In order to provide for a maximum sensitiveness to releasing and a minimum sensitiveness to applying the brakes, the equalizing slide valve 11 is provided with a resistance increasing cavity 125 having a port 126 which, in the release position of the parts, registers with a port 127 in the graduating valve 12.

Considering all the operating units of the equipment in use, air supplied to the train pipe 13 flows through passages 14 and 15 to the equalizing piston chamber 8 and thence through feed groove 41 charges the valve chamber 10 with fluid under pressure and also the auxiliary reservoir through passage 18. If a supplemental reservoir is employed, the same is charged from the valve chamber 10 through port 42 in slide valve 11, passage 43, passages 44 and 45 in cap 46 and passage 47. Air also flows from the train pipe through passage 14 to the quick action valve chamber 48 and to one side of a protection valve device 49 and when the pressure in the train pipe exceeds a predetermined degree, the protection valve device is shifted to open communication from passage 14 to piston chamber 34. The emergency piston 33 is thereupon shifted to normal position in which feed groove 50 is open, so that the valve chamber 36ª is charged with fluid under pressure and also the quick action chamber 51 through passage 52. The quick action closing chamber 53 is charged from valve chamber 36ª through passage 54 and fluid is supplied through port 55 and passage 56 to piston chamber 57 at one side of cut-off piston 58, thereby shifting said piston and the valve 59 to open position in which communication is established from passage 60 to passage 23 leading to the brake cylinder. In the open position of the protection valve device 49, communication is established from the train pipe to passages 61 and 62 and thence through cavity 63 in cap 64 to passage 65 leading to the valve chamber of the electric emergency valve 29.

In the normal release position of the emergency slide valve 35, a cavity 66 therein connects passage 67 leading to the piston chamber 68 at one side of the pilot valve piston 39 with an exhaust port 69, and as the opposite side of the pilot valve piston 39 is open to an exhaust port 70, the spring 71 maintains the valve 40 in its closed position. The main reservoir 72 is connected by pipe 73 to passage 74 leading to one side of the high pressure emergency valve device 38 and fluid from the main reservoir equalizing around said valve device permits the spring 75 to hold the same closed.

In release position of the equalizing valve device, the outer face of release piston 76 is connected through passage 77, port 78 in slide valve 11, cavity 79 in graduating valve 12, and port 80 with an exhaust port 81. The release valve device also has a piston head 82 of less area than the piston 76 and carrying a valve 83. The differential area of said release valve device is connected to the brake cylinder through passages 21 and 23 around valve 59 to passage 60 and thence through passages 84 and 85, so that with any pressure in the brake cylinder, the release valve device will be shifted to release position, in which valve 83 is open and the brake cylinder is connected to the atmosphere through passage 84, passage 86, past the open electric release valve 25 to the exhaust passage 87.

An electro-pneumatic brake valve 88 is preferably provided at each end of the car and the movement of the brake valve handle is adapted to effect variations in train pipe pressure and also control the circuits of the electric controlling mechanism. The electric circuits may comprise a service application wire 89, an emergency wire 90, a release wire 91, a supply wire 92, a positive current wire 93, and a negative current wire 94.

In order to effect an electric service application of the brakes, the brake valve 88 is turned to electric and pneumatic service application position, in which the service magnet 26 is energized to open the valve 27, as shown in Fig. 2 of the drawings. Fluid is thereupon vented from piston chamber 8 of the equalizing valve device and from the train pipe through passage 95, cavity 96 in cap 64, and passage 97 to passage 98 and thence, lifting check valve 99, to passage 22 which is open to the brake cylinder. Provision is also made for venting air from the train pipe to the atmosphere through an atmospheric port 100 communicating with passage 98, the latter port being closed by means of a screw plug 101 when the brake cylinder vent is employed.

The initial movement of the equalizing piston 9 closes the supplemental reservoir charging port 42 and feed groove 41, and before the lost motion between the equalizing piston 9 and the main slide valve 11 is taken up, a cavity 128 in the graduating valve 12 connects port 126 with port 80 open to exhaust port 81, so that the resistance of the main slide valve 11 to movement is increased according to the area of cavity 125 exposed to atmospheric pressure. The area of the cavity 125 can be made to provide any desired resistance, but preferably is designed so that light train pipe reductions, say below five pounds, such as might be due to leakage, will not cause movement of the main slide valve, but if the reduction in train pipe pressure is five pounds or more the equalizing piston will shift the main valve to service application position, thus providing a minimum degree of sensitiveness to applying. In service position, fluid is supplied to the brake cylinder through service port 103, passage 77, and acting on the outer face of the release piston, shifts the same to the position shown in Fig. 2, in which fluid can flow from passage 77 to passage 104 and past check valve 105 to passage 60, thence past the open cutoff valve 59 to passage 23 and the brake cylinder.

The inner reduced area of the piston 82 being open to atmospheric pressure, it will be evident that an unbalanced brake cylinder pressure acts on the outer face of piston 76 which effects the prompt closing of the valve 83.

A safety valve 106 is connected by passage 107 to the chamber of the cut-off valve device into which the passage 60 opens, so that when the valve 59 is open, the brake cylinder is connected to the safety valve, and the pressure in the brake cylinder is limited to a predetermined degree, according to the adjustment of the safety valve.

One feature of my invention consists in providing means for limiting the reduction in train pipe pressure which may be made by the electric service valve to the equalizing point when the same is adjusted to vent to the atmosphere. For this purpose, a valve piston 108 is provided in the equalizing piston 9, which has a movement relative to the equalizing piston and is subject on one side to the pressure of a spring 109. Upon movement of the equalizing piston to service application position, the valve piston 108 is adapted to seat and cut off communication from passage 95 to the piston chamber 8. Air flows from the auxiliary reservoir to the brake cylinder until the auxiliary reservoir pressure is slightly less than the train pipe pressure, then the equalizing piston moves to service lap position. This movement also lifts the valve piston 108 from its seat and again establishes communication from the train pipe to the service magnet passage 95 and if the service magnet valve is still open, the equalizing piston will again move to service application position. A further reduction of auxiliary reservoir pressure into the brake cylinder is thus produced and the movement between service and lap positions continues until the auxiliary reservoir equalizes into the brake cylinder and then the auxiliary reservoir pressure not reducing further the train pipe pressure will not move the equalizing piston to lap position, so that the valve piston 108 remains seated and prevents any reduction in train pipe pressure below the equalizing point.

Another advantage in providing means for cutting off communication from the train pipe to the service magnet valve consists in the fact that same operates to prevent such a reduction in train pipe pressure as might cause undesired quick action, for example, if there should happen to be a leakage of air from the train pipe, this leakage in conjunction with the venting of fluid from the train pipe by operation of the service magnet might produce a sufficient reduction in train pipe pressure to cause an emergency application of the brakes. Such action is prevented by means of my improvement, since under the conditions above referred to, the rate of flow from the train pipe would necessarily exceed the usual service rate of flow from the auxiliary reservoir side of the triple valve piston to the brake cylinder and consequently the triple valve piston would promptly move out so as to cause the valve piston 108 to seat, thus cutting off the service magnet valve passage and thereby preventing the further venting of fluid from the train pipe through operation of the magnet valve.

The brakes may be released by moving the brake valve handle to release position, in which the train pipe pressure is increased and the equalizing piston 9 thereby shifted to release position.

It should be noted here that in releasing the brakes, the port 126 registers with port 127 in the graduating valve 12, so that fluid under pressure in the valve chamber 10 equalizes into the resistance increasing cavity 125 and as a consequence, since the main slide valve 11 now offers a minimum resistance to movement, only a slight increase in train pipe pressure is required to move the equalizing valve parts to release position. In this position, the back of the release piston 76 is connected to the atmosphere through passage 77 and port 78 and the release valve device is therefore promptly shifted to release position by the brake cylinder pressure acting on the opposite side, and fluid is released from the brake cylinder through passage 23, passage 60, passage 84, passage 86, and exhaust passage 87.

The check valve 105 serves to prevent back flow from the brake cylinder to the release piston 76, so that in releasing there will be only the fluid in the chamber in front of the release piston and in the connecting passage 104 to be vented, in order to effect the movement of the release piston.

By providing a separate release valve device, large release ports may be employed so as to secure a prompt release of the brakes, without the necessity of providing a large exhaust cavity in the equalizing slide valve. The size of the equalizing piston may thus be reduced and the equalizing valve parts may be made smaller and more compact.

In order to effect an electric emergency application of the brakes, the brake valve handle is turned to emergency position, in which the emergency magnet 28 is energized to open the electric emergency valve 29. Fluid under pressure is thereupon vented from the train pipe through passages 14, 61, and 62, cavity 63, and passage 65 to atmospheric exhaust port 110. The equalizing piston 9 is thus shifted to its seat the same as in service and the venting of fluid through the train pipe through the electric emergency valve is at such a rate that emergency piston 33 is also shifted to the position shown in Fig. 3. In this position of the emergency valve 35, fluid is admitted from the quick action chamber 51 to pilot valve piston 39 through port 111 and passage 67. The movement of piston 39 opens valve 40, so that fluid is vented from the back of the high pressure emergency valve device 38 through passage 113 and exhaust port 70. The main reservoir pressure on the opposite side of the valve 38 then shifts the same so as to open communication from the main reservoir passage 74 to passage 21 leading to the brake cylinder, thus permitting the quick equalization of main reservoir air into the brake cylinder.

The movement of the emergency slide valve also connects the other face of the cut-off piston 58 with the atmosphere, through passage 36, cavity 66 in the emergency valve, and exhaust port 69. The cut-off valve 59 is thus shifted to its closed position so as to prevent flow of main reservoir air to the safety valve or to the auxiliary reservoir. The auxiliary reservoir is, however, still open to the safety valve through port 103, passage 77, passage 104, and passage 60, so that the auxiliary reservoir pressure is gradually blown down through the safety valve, thus permitting of a ready release of the brakes after an emergency application.

The emergency slide valve 35 also connects the quick action closing chamber 53 with one side of the quick action piston 36 through passage 54, cavity 114 in slide valve 35, and passage 115. A passage 116 leads from the passage 115 to one side of the emergency switch piston 30 so that the movable switch 31 is operated by the piston 30 to close the emergency magnet circuit through the stationary contacts 32.

The movement of quick action piston 36 by means of the fluid supplied thereto from the quick action closing chamber opens the quick action vent valve 37 to vent air from the train pipe to the atmospheric exhaust port 117.

The emergency switch 31 and the quick action valve 37 remain open until the fluid in chamber 53 has been drained out through the restricted port 118 in piston 36 when these parts will be returned to normal position. In order to maintain the pressure in quick action chamber 51 against possible leakage a passage 119 uncovered by the movement of the equalizing slide valve 11 is adapted to supply fluid from the auxiliary reservoir to the valve chamber 36ª and the quick action chamber when the emergency slide valve 35 is shifted to emergency application position.

The check valve 99 prevents possible back flow of air from the brake cylinder past the service application magnet valve in an emergency application of the brakes. The check valve 105 prevents flow of air from the brake cylinder to the outer face of the release piston 76 in making a release of the brakes.

In order to provide for pneumatic graduated release, a supplemental reservoir 120, connected by pipe 121 to passage 47 may be employed and this reservoir is charged in release position of the equalizing slide valve 11 through port 42 and passages 43, 44, 45, and 47. If the brake valve is turned to release position after an application of the brakes, and then back to lap position, the equalizing valve parts will be shifted to release position by the increase in train pipe pressure.

The outer face of release piston 76 is thus connected to the atmosphere and the valve 83 is operated by piston 76 to open communication for releasing air from the brake cylinder. The flow of air from the charged supplemental reservoir to the auxiliary reservoir quickly raises the auxiliary reservoir pressure above the train pipe pressure, so that the piston 9 moves the graduating valve 12 to the graduated release lap position, in which passage 77 leading to one side of the release piston 76 is connected by port 78, cavity 79 and port 102 with passages 84 and 85. Pressures on opposite sides of the large piston 76 are thus balanced but the end of the small piston 82 being open to the atmosphere, an unbalanced pressure acts on the release valve device to shift the same to closed position cutting off further release of air from the brake cylinder.

Further gradual reductions in brake cylinder pressure may be made by making additional increases in train pipe pressure, the operation above described being repeated.

Having now described my invention, what I claim as new and desire to secure by Letters Patent, is:—

1. In a fluid pressure brake, the combination with a train pipe, a chamber from which fluid is supplied to effect an application of the brakes, and an equalizing valve device subject to the opposing pressures of the train pipe and said chamber, of a passage through which fluid may be vented from the train pipe side of said equalizing valve device and means for limiting the venting of fluid through said passage when the train pipe pressure reduces at a greater rate than the pressure in said chamber.

2. In a fluid pressure brake, the combination with a train pipe, of an automatic valve device comprising valve means for effecting an application of the brakes, a piston chamber open to the train pipe, a piston therein for operating said valve means upon a reduction in train pipe pressure, a passage communicating with said chamber, electrically controlled means for venting fluid from said chamber through said passage, and a valve operated by said piston for closing communication from said chamber through said passage upon a reduction in pressure in said chamber.

3. In a fluid pressure brake, the combination with a train pipe, auxiliary reservoir, and brake cylinder, of an automatic valve device comprising valve means for supplying fluid from the auxiliary reservoir to the brake cylinder, a piston subject to the opposing pressures of the train pipe and auxiliary reservoir for operating said valve means, means for venting fluid from the train pipe through a passage communicating with the train pipe side of said piston, and a valve operated by said piston for closing communication from the train pipe through said passage upon a reduction in train pipe pressure.

4. In a fluid pressure brake, the combination with a train pipe, auxiliary reservoir, and brake cylinder, of an automatic valve device comprising valve means for supplying fluid from the auxiliary reservoir to the brake cylinder, a piston subject to the opposing pressures of the train pipe and auxiliary reservoir for operating said valve means, a passage communicating with the chamber at the train pipe side of said piston, electrically controlled means for venting fluid from said chamber and the train pipe through said passage, and a valve operated by said piston for closing communication through said passage upon a reduction in train pipe pressure.

5. In a fluid pressure brake, the combination with a train pipe, auxiliary reservoir, and brake cylinder, of an automatic valve device comprising valve means for supplying fluid from the auxiliary reservoir to the brake cylinder, a piston subject to the opposing pressures of the train pipe and auxiliary reservoir for operating said valve means, a passage communicating with the chamber at the train pipe side of said piston, electrically controlled means for venting fluid from said chamber and the train pipe through said passage, and a valve operated by said piston for closing communication through said passage upon a reduction in train pipe pressure, said valve device being adapted to open said passage by movement of the piston upon a reduction in auxiliary reservoir pressure by flow to the brake cylinder to a degree slightly less than the train pipe pressure.

6. In a fluid pressure brake, the combination with a train pipe and a valve device operating upon a reduction in train pipe pressure for effecting an application of the brakes, of two passages through which the fluid pressure can be reduced communicating with the train pipe side of said valve device, and a spring pressed valve carried by said valve device and having a movement relative thereto for controlling communication through one of said passages.

7. In a fluid pressure brake, the combination with a train pipe and an equalizing valve device comprising a slide valve and a piston subject to variations in train pipe pressure for effecting applications of the brakes, of a cavity in said slide valve for adding a resistance to movement in applying the brakes and means for eliminating said resistance in the movement to release the brakes.

8. In a fluid pressure brake, the combination with a train pipe and an equalizing valve device comprising a slide valve and a piston subject to variations in train pipe pressure for effecting applications of the brakes, of a cavity in said slide valve having communication with the atmosphere in applying the brakes to add a resistance to movement, said cavity being supplied with fluid under pressure upon movement to release the brakes, to eliminate said resistance and minimize the resistance to releasing the brakes.

9. In a fluid pressure brake, the combination with a train pipe, a main slide valve, an auxiliary slide valve mounted on and having a movement relative to said main valve, and a piston subject to variations in train pipe pressure for operating said valves to effect applications of the brakes, of a cavity in said main valve, a port in said auxiliary valve for connecting the cavity to the atmosphere in the movement to effect an application of the brakes, and another port controlled by said auxiliary valve for supplying fluid to said cavity in the movement to release the brakes.

10. In a fluid pressure brake, the combination with a train pipe, a slide valve and a piston subject to train pipe pressure for operating said valve to effect an application of the brakes, of a separate valve device for controlling the release of the brakes, a cavity in said slide valve for adding a resistance to the usual resistance to movement in applying the brakes, and means for eliminating said added resistance in the movement of the slide valve to effect the release of the brakes.

11. In a fluid pressure brake, the combination with a train pipe, brake cylinder, auxiliary reservoir, and an automatic valve device operated upon a reduction in train pipe pressure for supplying fluid from the auxiliary reservoir to the brake cylinder, of a release valve mechanism comprising a valve for controlling the brake cylinder exhaust and a piston for operating said valve, and restricted ports controlled by said automatic valve device for venting one side of said piston to the atmosphere in release position to open the brake cylinder exhaust and operated by the flow of air from the auxiliary reservoir to the brake cylinder in applying the brakes for closing said brake cylinder exhaust.

12. A brake controlling valve device comprising a valve mechanism operating upon a gradual reduction in train pipe pressure for applying the brakes, a valve mechanism for effecting an emergency application of the brakes, said valve mechanisms being provided with gasket faces having operating port connections, and a bracket having corresponding gasket faces with port connections adapted to register with the port connections of said valve mechanisms to provide for controlling the brakes either with or without the emergency feature.

13. A brake controlling valve device comprising a valve mechanism operating upon a gradual reduction in train pipe pressure for effecting a service application of the brakes, a valve mechanism for effecting an emergency application of the brakes, an electrically controlled valve mechanism for controlling the brakes electrically, each valve mechanism having a gasket face provided with operating port connections, and a bracket having gasket faces provided with port connections to correspond with the port connections in the gasket faces of said valve mechanisms, to thereby provide an equipment in which the service controlling mechanism may alone be installed at one time, or in conjunction with one of or both the electric and emergency mechanisms at other times.

14. In a fluid pressure brake, the combination with a train pipe, auxiliary reservoir, brake cylinder, and an automatic valve device for supplying fluid from the auxiliary reservoir to the brake cylinder upon a reduction in train pipe pressure, of a chamber normally containing fluid under pressure, an emergency valve mechanism subject on one side to the pressure of said chamber for effecting an emergency application of the brakes, and means adapted to supply fluid from the auxiliary reservoir to said chamber in an emergency application to maintain said emergency valve mechanism in emergency position.

15. In a fluid pressure brake, the combination with a train pipe, a brake cylinder, and a valve device operated upon a reduction in train pipe pressure for effecting an application of the brakes, of an electrically controlled valve which may be adjusted for venting fluid from the train pipe at one time to the atmosphere and at another time to the brake cylinder.

In testimony whereof I have hereunto set my hand.

WALTER V. TURNER.

Witnesses:
  A. M. CLEMENTS,
  S. W. KEEFER.